US008569665B2

(12) United States Patent
Cheng

(10) Patent No.: US 8,569,665 B2
(45) Date of Patent: Oct. 29, 2013

(54) COOKWARE WITH TARNISH PROTECTED COPPER EXTERIOR

(75) Inventor: Stanley Kin-Sui Cheng, Vallejo, CA (US)

(73) Assignee: Meyer Intellectual Properties Limited (VG)

( * ) Notice: Subject to any disclaimer, the term of this patent is extended or adjusted under 35 U.S.C. 154(b) by 1251 days.

(21) Appl. No.: 11/550,205

(22) Filed: Oct. 17, 2006

(65) Prior Publication Data

US 2008/0099466 A1 May 1, 2008

(51) Int. Cl.
*H05B 6/12* (2006.01)
*A47J 27/00* (2006.01)

(52) U.S. Cl.
USPC ...... 219/621; 219/622; 220/573.1; 126/390.1

(58) Field of Classification Search
USPC ............. 219/620–622; 126/390.1; 220/573.1, 220/912
See application file for complete search history.

(56) References Cited

U.S. PATENT DOCUMENTS

| 3,490,126 A * | 1/1970 | Miller ........................... 428/677 |
| 4,004,892 A * | 1/1977 | Ulam ............................ 428/652 |
| 4,646,935 A * | 3/1987 | Ulam ........................... 220/573.1 |
| 2003/0232206 A1 * | 12/2003 | Jordens et al. ............... 428/469 |
| 2005/0040171 A1 | 2/2005 | Alim |
| 2005/0161458 A1 * | 7/2005 | Cheng et al. ............... 220/573.1 |
| 2005/0205646 A1 * | 9/2005 | Cheng ........................... 228/101 |

FOREIGN PATENT DOCUMENTS

| GB | 583707 A | 12/1946 |
| GB | 598502 A | 5/1948 |
| GB | 835620 A | 5/1960 |
| JP | 5-344927 | * 12/1993 ................... 220/912 |
| WO | 99/56950 A | 11/1999 |

* cited by examiner

*Primary Examiner* — Quang Van
(74) *Attorney, Agent, or Firm* — Edward S. Sherman

(57) ABSTRACT

An article of cookware in the form of a cooking vessel exposes only a portion of a copper inner layer on the upper portion of the exterior sidewall. The layer does not change color or tarnish as it sufficiently distal from the bottom of the cooking vessel that it is not subject to direct heat and oxidation during normal use. The unique bright color of the native copper is further protected from tarnish caused by fingerprint by a protective coating that can withstand moderate heating.

8 Claims, 3 Drawing Sheets
COOKWARE WITH TARNISH PROTECTED COPPER EXTERIOR

CROSS REFERENCE TO RELATED APPLICATIONS

None

BACKGROUND OF INVENTION

The present invention relates to article of cookware, and in particular to cookware vessels fabricated at least in part from copper Copper cookware is appreciated for its high thermally conductivity as well as the reddish-gold appearance. This reddish-gold appearance is unique from other metals with the exception of gold and copper alloys, such as brass and bronze, and thus readily distinguishes such cookware. Although copper cookware is both beautiful and considered to offer superior cooking performance, due to the high thermal conductivity, it tarnishes readily on exposure to heat as well as liquids (including the moisture residue on the fingers to create finger prints). Accordingly, because of the extra effort required to clean such tarnish, copper cookware is not popular with some consumers despite its other benefits.

Prior methods of minimizing the tarnishing of copper cookware include burying the copper layers in at least one of interior and exterior metal cladding so it is not visible, as for example in U.S. Pat. No. 6,267,830 (issued Jul. 31, 2001 to Groll). While this provides most of the thermal performance benefits of copper it eliminates the secondary benefits of its unique and elegant appearance.

Another partial attempt to solve this problem is provided by U.S. Pat. D474,936 (issued on May 27, 2003 to Groll) wherein a indented golden copper colored band formed around the outer periphery on a lower portion of a cooking vessel as decorative feature. Although this design exposes some copper metal, it still does not prevent tarnishing. Further, such a groove tends to collect dirt and debris and is more difficult to clean out than a largely straight sided cooking vessel.

Although protective coatings have been applied to copper to prevent tarnishing, they suffer from two deficiencies. A variety of inorganic coatings have been suggested to apply in place of or over copper, such as transition metal nitrides, oxy-nitrides and carbides as they can achieve different shades of reflective golden metal appearances. However, such inorganic coatings are both expensive and not necessary thermally and chemically stable in cooking at high temperature, where they can be exposed to direct flames. It has been found that such coatings, when applied as a thin layer over copper merely temporally minimize the development of a tarnished appearance, which eventually occurs as the underlying copper oxidizes at high temperatures. Eventually this oxidized copper becomes visible, starting first at the bottom of the cookware, which undergoes multiple cycles of exposure to high temperature.

Organic lacquers, while capable of preventing tarnishing on decorative copper items do not withstand the high temperatures that are reached by functional cookware. This is particularly a problem at the bottom of the cookware article that is exposed either directly to the flame, but also of issue somewhat more distal from the heater element, as the copper is a good conductor of heat.

It is therefore a first object of the present invention to provide clad cookware that exposes copper layers that are easy to clean and do not trap dirt.

It is a further object of the invention to provide exposed copper layers that do not tarnish under normal use conditions, maintaining the beauty of copper cookware, yet without the high maintenance of cleaning tarnished copper.

Yet another object of the present invention is to provide a simpler and lower cost fabrication method for creating clad cookware that exposes such copper layers.

SUMMARY OF INVENTION

In the present invention, the first object is achieved by forming a cooking vessel having an inner lining with a bottom surface and surrounding sidewalls extending upward there from to a rim to form an inner fluid containing vessel, the rim of lining defining the upper extent of the rim of the article of cookware. An outer cladding layer covers the exterior of the bottom surface of the inner lining and extends upward there from to cover a bottom portion of the exterior of the surrounding sidewalls of the inner lining. A copper cladding covers at least the portion of the surrounding sidewalls of the inner lining not covered by the outer cladding to form a portion of the visible external surface of the cookware article by extending upward to join the rim of the inner lining.

A second aspect of the invention is characterized in that the exposed exterior copper cladding is covered by a protective coating, and more preferably an organic heat resistant transparent lacquer.

The above and other objects, effects, features, and advantages of the present invention will become more apparent from the following description of the embodiments thereof taken in conjunction with the accompanying drawings.

DETAILED DESCRIPTION

Figure 1A:
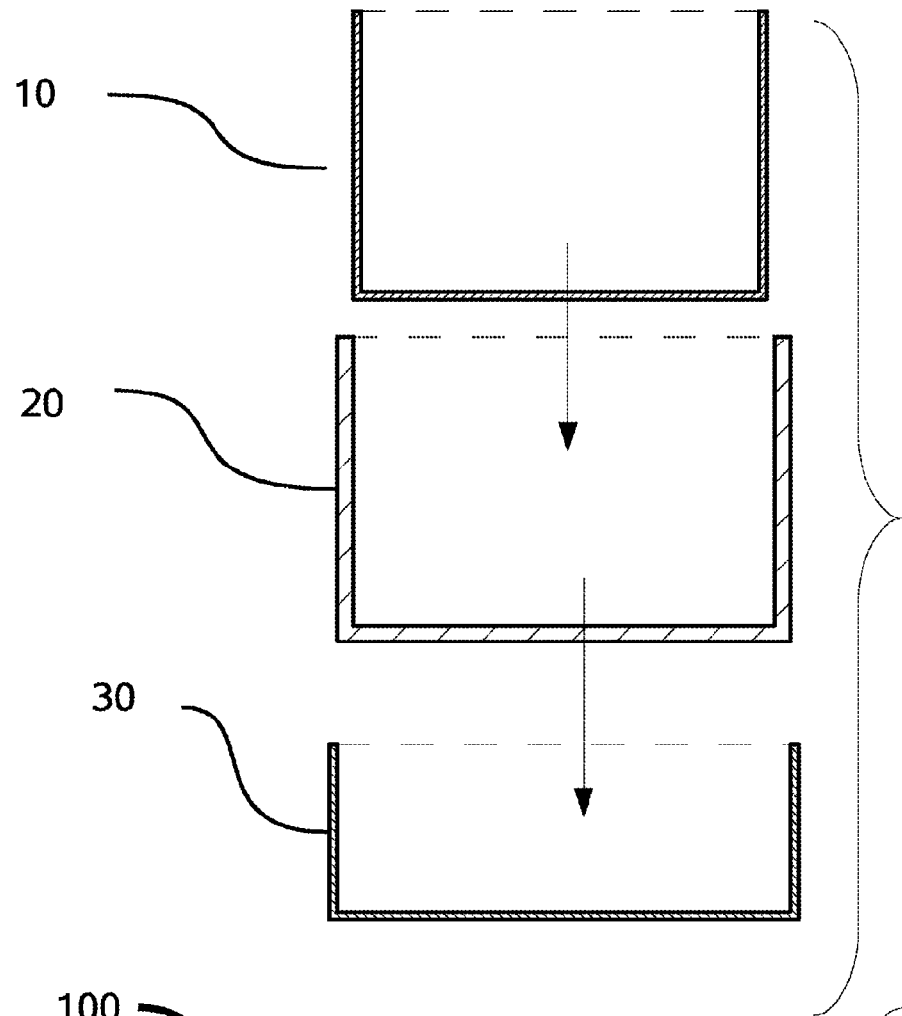
FIG. 1A is schematic illustration of a sequence of processing steps used to fabricate the article of cookware shown in FIG. 1B
Figure 1B:
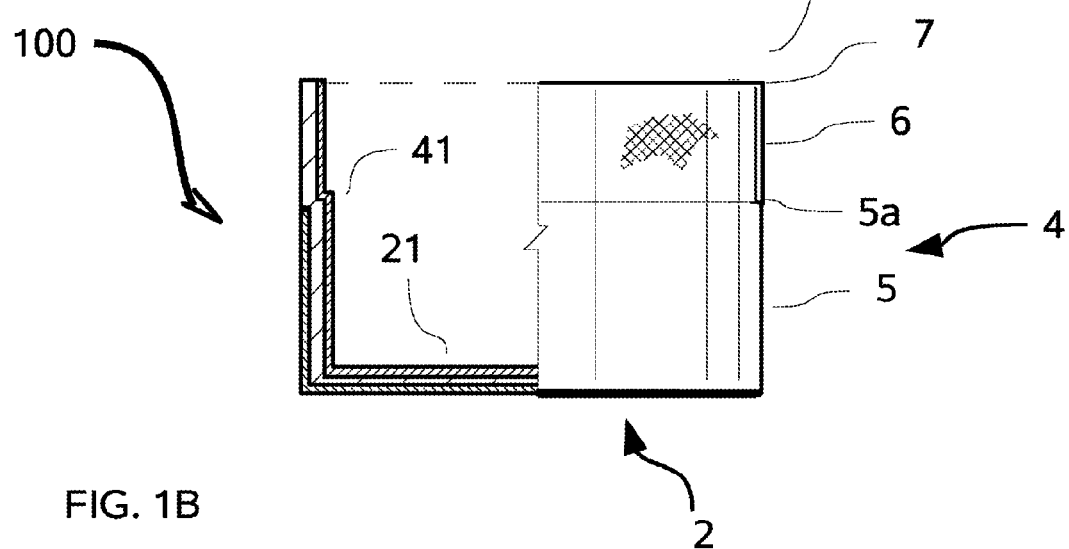
FIG. 1B is an elevation of an article of cookware showing a partial view of the cross section as resulting from the processing steps in FIG. 1A.
Figure 2:
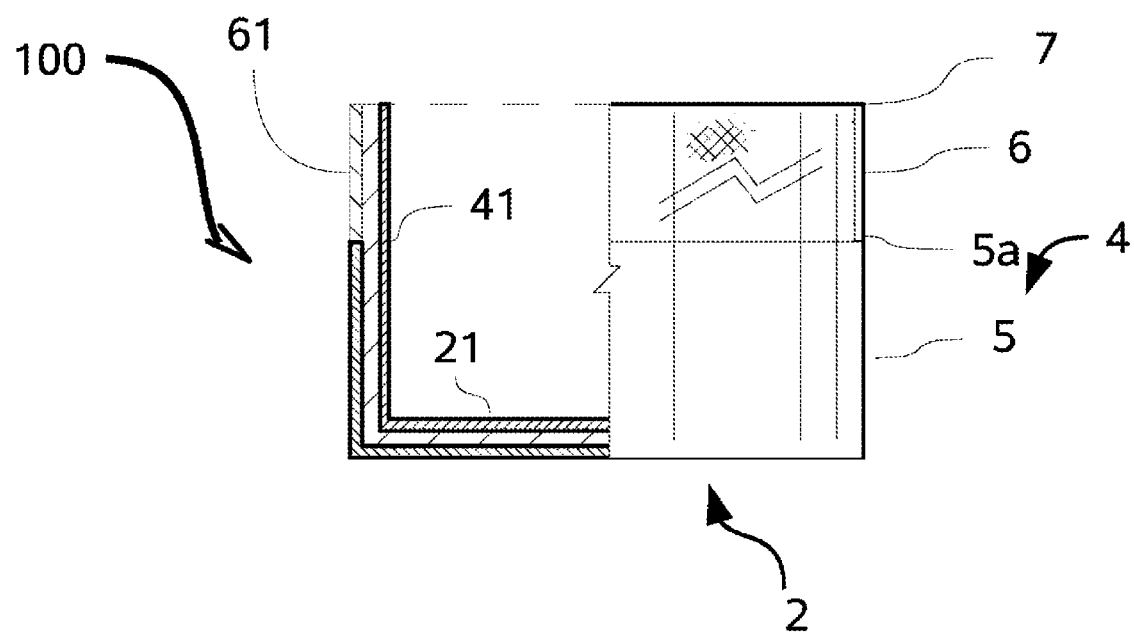
FIG. 2 is an elevation of another alternative embodiment for the article of cookware showing a partial view of the cross section.
Figure 3:
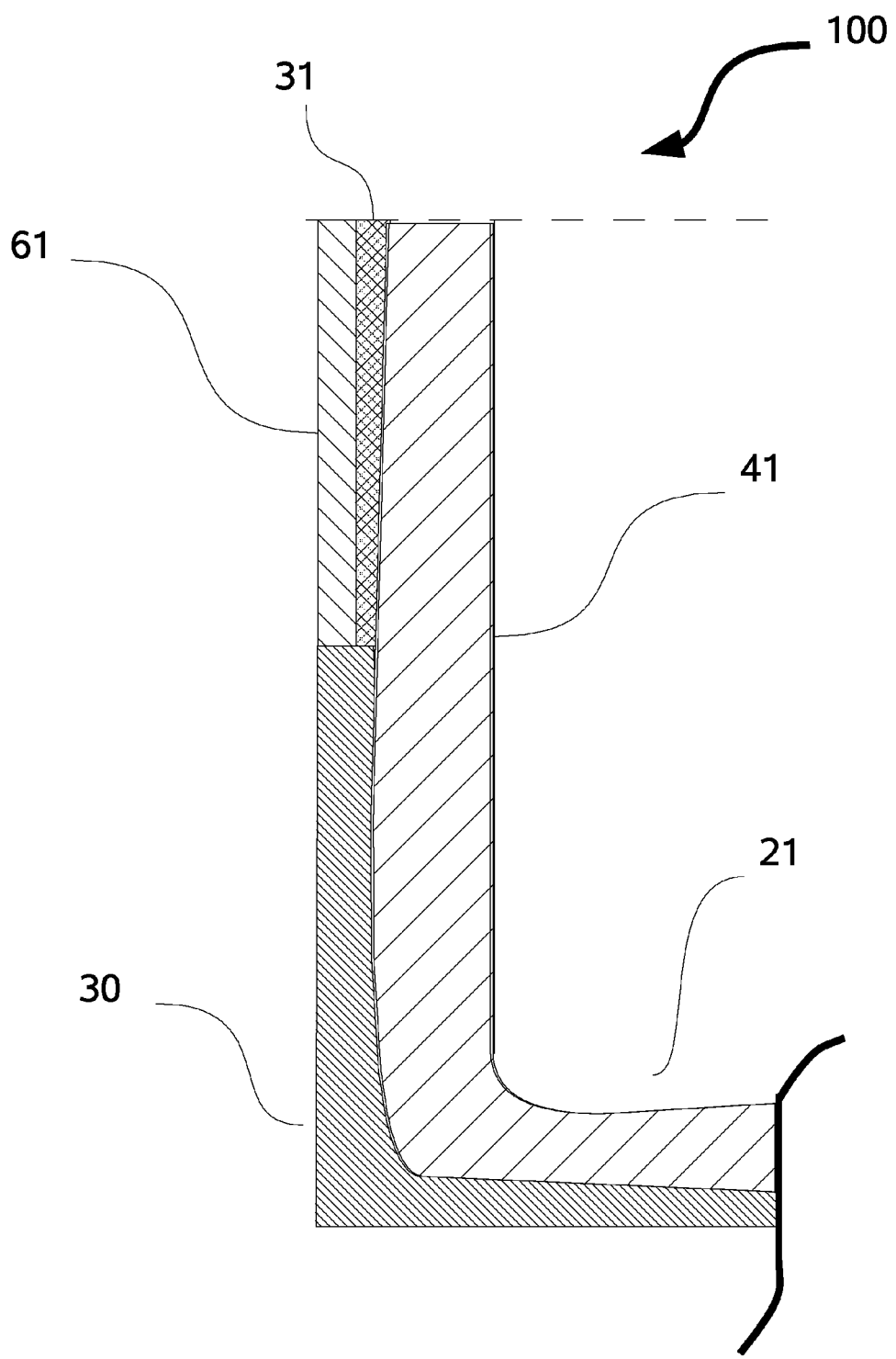
FIG. 3 is a partial cross section of another embodiment of the invention.

Referring to FIGS. 1 through 3, wherein like reference numerals refer to like components in the various views, there is illustrated therein a new and improved article of cookware with a copper exterior, generally denominated 100 herein.

In accordance with the present invention, FIG. 1B illustrates a cookware vessel 100 having a bottom generally denoted by numeral 2, and substantially upright and surrounding sidewalls 4 connected to the bottom 2 to form a fluid containing vessel. The surrounding sidewall has a lower portion 5 connected to the bottom 2 and an upper portion 6 that is at least externally visible as extending upward from the edge 5a of lower portion 5 to the vessel rim 7. The visible upper portion of the external wall 6 is preferably copper or an alloy thereof. In contrast, the externally exposed lower portion 5 is preferably stainless steel, or another material that unlike copper, is not susceptible to tarnishing when exposed to high temperatures. By visibly exposing the copper closer to rim 7, and farther from the bottom 2, the visible copper remains cooler during cooking and is thus less susceptible to tarnishing, as well as capable of being covered with various protective coatings that can withstand the reduced temperatures in thus region. This embodiment, shown in one form in FIG. 2, will be further discussed below.

As shown in FIG. 1A, the cookware vessel 100 is optionally formed from a fluid containing inner lining 10 that forms the interior bottom surface 21 and interior side surface 41 of the cooking vessel 100. The inner lining is nested within and attached to an intermediate lining 20, of which at least the upper portion has a copper appearance or is fabricated entirely from copper or an alloy thereof. The lower portion 5 of the exterior wall is provided by an outer cladding 30 the covers the exterior of the bottom 2 and the lower portions of the fluid containing inner lining 10 and the lower of portion of the intermediate lining 20. The intermediate lining 20 is preferably copper or an alloy thereof having a thickness of about 1.5 mm. The inner lining 10, intermediate lining 20 and outer cladding 30 are nested and bonded to each other in the nested arrangement shown in FIG. 1. Alternatively, the inner lining is another metal, such as aluminum or stainless steel, which merely has an upper outer band of copper cladding, thinner copper plating or a copper appearing coating. More preferably, both the inner lining 10 and the outer cladding 30 are 0.6 mm thick grade 18/8 stainless steel The outer cladding 30 is shorter than the inner lining 10 to expose an intermediate upper portion of the intermediate lining 20 whereby the layer of copper, or copper appearing portion that is exposed is a portion of a continuous cladding layer that is also adjacent to the outer cladding at the bottom 2 and the lower portion, below seam 5a, of the sidewall 5.

In another alternative embodiment of the invention, which is illustrated in FIG. 2, the exposed copper layer 6 is covered with a protective coating 61. Preferably, this protective coating is transparent, and more preferably this transparent protective coating is an organic lacquer It should be understood that in other alternative embodiment of the invention additional layers of thermally conductive materials, such as aluminum or non-exposed layers of copper or alloys thereof, are laminated into the sides 5 or bottom 2 of the cooking vessel 100.

It should be appreciated the methods of laminating and bonding the nested assembly of FIG. 1A includes at least one of brazing, impact bonding, ironing, laser welding and like processes.

The laser welding can be performed at the upper rim 7 or the junction 5a between the copper and the lower sidewall material. Such laser welding is preferably carried out after brazing and/or ironing.

It should be noted that although FIG. 1B of the completed vessel shows the copper intermediate lining 20 as flush with the edge of the exterior cladding at seam 5a, this is merely a preferred embodiment. This flush seam at 5a can be formed during the process of bonding the assembly, such as by impact bonding in a matching die set. Alternatively, the inner copper vessel 20 can also be swaged such that it is the same outer diameter above outer cladding 30, forming a flush seam at 5a. Such swaging can be done after nesting and bonding, or before, thus resulting in completed vessel 100 shown in FIG. 1B.

Alternatively an ironing process can be used to reduce the thickness of copper in the sidewall 5 with respect to the bottom portion 2, as well as deforming a portion of the inner lining 10 and intermediate lining 20, to form the flush seam 5a. The ironing process is simply a sequence of deep drawing type forming process between a set of dies with the clearance between the male and female die members being progressively smaller than the actual combined side wall thickness of the original wall thickness of the inner cladding 10, intermediate copper cladding 20 and outer cladding 30. As the intermediate cladding of copper 20 is much softer than stainless steel inner 10 and outer 30 cladding, it will under go a reduction in thickness during an iron process.

Further, as it can be difficult in a brazing process to fully reflow liquid flux over the entire interfacial area to be bonded, air and moisture can be trapped within such gaps that remain at these interfaces. Accordingly, it is preferable in forming cooking vessel 100 to perform the ironing process after brazing the nested assembly of FIG. 1B. The ironing process has another advantage in that it gradually expels air and moisture trapped in such gaps at each interface between nested components.

The protective coating 61 can be an organic lacquer or an inorganic coating. Inorganic coatings includes metal nitrides that have a reddish reflective color like copper. Examples of inorganic coatings are disclosed in the U.S. Pat. No. 5,447,803 (issued Sep. 5, 1995 to Nagaoka et al), U.S. Pat. No. 3,669,695 (issued on Jun. 13, 1972 to Iler et al) and U.S. Pat. No. 5,320,689 (issued on Jun. 14, 1994 to Mahulikar, et al.) and U.S. Pat. No. 6,586,114 issued on Jul. 1, 2003 to Anton), all of which are incorporated herein by reference. A wide variety of transparent organic lacquers can be used, such as alkyd resin varnish or lacquer, as well as others clear organic coatings of suitable heat-resistance. It is particularly preferable to utilize a non-stick transparent organic coating, such as a flouro-polymer coating.

FIG. 3 illustrates an alternative embodiment of the invention in which on the exposed portion of the inner lining 10 has a copper or copper colored coating 31, rather than a full intermediate copper cladding or layer 30 as shown in FIG. 2. This copper type coating 31 is preferably covered by a clear thermally resistant coating 61. Alternatively the copper appearing region 31 is alternatively a band of solid copper metal laminated to the outside of the upper portion of the inner liner, and not extending to the bottom 2 of the cooking vessel 100.

The inner lining is optionally stainless steel, aluminum, hard anodized aluminum, cast iron, copper or a ceramic high temperature enamel coating. Any of such lining may be further covered by a non-stick coating, such as a flouro-polymer coating.

The outer cladding below the copper or coated copper layer is preferably stainless steel, however it can also be hard anodized aluminum, cast iron, or a ceramic high temperature enamel coating on a metal base and the like.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

The invention claimed is:
1. An article of cookware comprising:
a) inner lining having;
 i) a bottom surface,
 ii) surrounding sidewalls extending upward there from to a rim to form an inner fluid containing vessel, the rim of said inner fluid containing vessel defining the upper extent of the rim of the article of cookware,
b) an outer cladding layer that covers the exterior of the bottom surface of said inner lining and extends upward there from to cover a bottom portion of the exterior of the surrounding sidewalls of said inner lining, wherein said outer cladding was in substantially the same shape before attachment to cover the exterior bottom surface of the inner lining, extending upward to a position substantially below the rim, c) a copper cladding that covers at least the portion of the surrounding sidewalls of said inner lining not covered by said outer cladding to form a portion of the visible external surface of the cookware article by extending upward to join the rim of said inner lining, wherein said exposed copper cladding is covered by a protective coating that prevents the visible discoloration thereof.

2. An article of cookware according to claim 1 wherein the protective coating is an organic coating.

3. An article of cookware according to claim 1 wherein the protective coating is a transition metal compound selected from the group consisting of metal nitrides, oxy-nitrides and carbides.

4. An article of cookware comprising:
a) inner lining having;
i) a bottom surface,
ii) surrounding sidewalls extending upward there from to a rim to form an inner fluid containing vessel, the rim of said inner fluid containing vessel defining the upper extent of the rim of the article of cookware,
b) an outer cladding layer that covers the exterior of the bottom surface of said inner lining and extends upward there from to cover a bottom portion of the exterior of the surrounding sidewalls of said inner lining, wherein said outer cladding was in substantially the same shape before attachment to cover the exterior bottom surface of the inner lining, extending upward to a position substantially below the rim,
c) a copper appearing cladding that covers at least the portion of the surrounding sidewalls of said inner lining not covered by said outer cladding to form a portion of the visible external surface of the cookware article by extending upward to join the rim of said inner lining,
wherein the copper appearing cladding comprises a transition metal compound selected from the group consisting of metal nitrides, oxy-nitrides and carbides.

5. An article of cookware according to claim 4 wherein said exposed copper appearing cladding is covered by a protective coating that prevents the visible discoloration thereof.

6. An article of cookware according to claim 5 wherein the protective coating is an organic coating.

7. An article of cookware comprising:
a) inner lining having;
i) a bottom surface,
ii) surrounding sidewalls extending upward there from to a rim to form an inner fluid containing vessel, the rim of said inner fluid containing vessel defining the upper extent of the rim of the article of cookware,
b) an outer cladding layer that covers the exterior of the bottom surface of said inner lining and extends upward there from to cover a bottom portion of the exterior of the surrounding sidewalls of said inner lining, wherein said outer cladding was in substantially the same shape before attachment to cover the exterior bottom surface of the inner lining, extending upward to a position substantially below the rim,
c) a copper cladding that covers at least the portion of the surrounding sidewalls of said inner lining not covered by said outer cladding to form a portion of the visible external surface of the cookware article by extending upward to join the rim of said inner lining,
wherein said outer cladding layer has a thickness of at least about 0.6 mm.

8. An article of cookware comprising:
a) inner lining having;
i) a bottom surface,
ii) surrounding sidewalls extending upward there from to a rim to form an inner fluid containing vessel, the rim of said inner fluid containing vessel defining the upper extent of the rim of the article of cookware,
b) an outer cladding layer that covers the exterior of the bottom surface of said inner lining and extends upward there from to cover a bottom portion of the exterior of the surrounding sidewalls of said inner lining, wherein said outer cladding was in substantially the same shape before attachment to cover the exterior bottom surface of the inner lining, extending upward to a position substantially below the rim,
c) a copper appearing cladding that covers at least the portion of the surrounding sidewalls of said inner lining not covered by said outer cladding to form a portion of the visible external surface of the cookware article by extending upward to join the rim of said inner lining, wherein said outer cladding layer has a thickness of at least about 0.6 mm.

* * * * *